(12) United States Patent
Cassassuce et al.

(10) Patent No.: US 7,361,904 B2
(45) Date of Patent: Apr. 22, 2008

(54) UV WATER PURIFICATION SYSTEM

(76) Inventors: Florence Valerie Cassassuce, #1450, Colonia Pueblo Nuevo, 23060, La Paz, Baja California Sur (MX); Itzcoatl Bareño Arce, #138, Colonia Esperanza 3, La Paz, Baja California Sur (MX); Oscar Rodriquez Zamudio, #231, Colonia Fidepaz 23090, La Paz, Baja California, Sur (MX)

(*) Notice: Subject to any disclaimer, the term of this patent is extended or adjusted under 35 U.S.C. 154(b) by 189 days.

(21) Appl. No.: 11/418,857

(22) Filed: May 5, 2006

(65) Prior Publication Data
US 2008/0067414 A1 Mar. 20, 2008

(51) Int. Cl.
*B01D 3/42* (2006.01)
(52) U.S. Cl. .................. 250/436; 250/437; 250/432 R
(58) Field of Classification Search ................ 250/436, 250/437, 435, 432 R; 422/186.3
See application file for complete search history.

(56) References Cited

U.S. PATENT DOCUMENTS

| | | | |
|---|---|---|---|
| 4,002,918 A | 1/1977 | Graentzel | |
| 4,537,149 A * | 8/1985 | Ryan | 119/243 |
| 4,762,613 A | 8/1988 | Snowball | |
| 5,441,179 A | 8/1995 | Marsh | |
| 5,536,395 A * | 7/1996 | Kuennen et al. | 210/87 |
| 6,193,894 B1 | 2/2001 | Hollander | |
| 6,336,998 B1 * | 1/2002 | Wang | 204/157.3 |
| 6,953,523 B2 | 10/2005 | Vandenbelt et al. | |
| 7,002,140 B2 | 2/2006 | Elsegood et al. | |
| 7,002,161 B2 | 2/2006 | Green | |
| 7,030,391 B2 | 4/2006 | Zagrobelny | |
| 7,217,343 B2 * | 5/2007 | Land | 203/1 |

* cited by examiner

*Primary Examiner*—Kiet T. Nguyen
(74) *Attorney, Agent, or Firm*—Ralph D'Alessandro

(57) ABSTRACT

A point of use water purifier for use in rural and under developed areas having a supply reservoir chamber in a first container and a treatment reservoir chamber in a second container underlying the first container and into which the first container is fitted, the water purifier employing a UV radiation source to selectively on demand expose untreated water selectively delivered from the supply reservoir chamber to the treatment reservoir chamber prior to dispensing water from the water purifier for consumption. The water purifier is connectable to an electrical power source such as a 12 volt battery or solar powered battery and is effective to remove substantially all viruses, bacteria and mold spores from untreated water in a short time upon exposure to UV radiation.

7 Claims, 2 Drawing Sheets

UV WATER PURIFICATION SYSTEM

FIELD OF INVENTION

This invention relates generally to water purification and more particularly to an apparatus for subjecting fluids to ultraviolet (UV) light. The apparatus may be used for water sterilization and is intended for point-of-use on demand application.

BACKGROUND OF THE INVENTION

In many less developed countries and in rural areas of many more developed countries, drinking water contamination is a serious problem leading to life threatening diseases. The resulting health problems are directly traceable to fecal contamination of the drinking water. Fecal contamination propagates waterborne diseases such as diarrhea, hepatitis and cholera, among others. This contributes to an infant mortality rate that exceeds by as much as ten times the rate in more developed countries. Fecal contamination of drinking water supply can result from multiple sources, such as animal excrement in rivers or, during dry seasons, in dry river beds located near drinking wells. The fecal contamination is then transferred to drinking wells from natural flow paths or from runoff during rainy seasons. Other transmission pathways include latrines situated near wells and non-hygienic drinking water containers within common areas where cups dipped into an open water container transfer bacteria from hands to the communal water supply.

Ultraviolet (UV) radiation sources have been found effective to sterilize water because of the wavelength of light emitted, typically centered around 254 nm, which is referred to as ultraviolet light or ultraviolet radiation. UV light represents a section of the overall electromagnetic spectrum of light, extending from the blue end of the visible at about 400 nm to a region of about 100 nm.

Prior point-of-use water sterilization devices typically are complex and costly, as well as not being suited for use in rural areas where simplicity, durability, and ease of operation are essential for sustained use. Some devices have employed heating systems to boil water, but are bulky and energy intensive. Other devices have more frequently employed the use of ultraviolet light to sterilize water. These include those shown and described in U.S. Pat. Nos. 7,030,391; 7,002,161; 7,002,140; 6,953,523; 6,193,894; 5,441,179 and 4,762,613 where some type of UV radiation is directed onto a supply of water, either by directing the water past the source of UV radiation or directing the UV radiation periodically at the water supply in a fixed chamber. The containers typically are expensive or the UV emitting radiation sources, such as elongated lamps, are encased in costly protective sheaths to prevent fouling from waterborne minerals or inactivated biological contaminants that can result from the photochemical reaction of the exposure of the UV radiation on the water. Alternatively the water sterilization devices will require costly wiper devices to clean the UV radiation source or periodic disassembly and delicate maintenance to maintain effectiveness. Emission or leaching of volatile organics from plastic wiper devices upon exposure to UV radiation is another disadvantage of prior art devices, such as the wiper device described in U.S. Pat. No. 4,002,918. Heat build-up in prior art devices has also been a problem that can affect performance. Accordingly, there is a need for a simple, low cost, reliable water purification device that may be employed in less developed nations and rural areas which requires minimal maintenance and is effective to supply a reliable source of purified drinking water.

These problems are solved in the design of the present invention which employs a low cost, simple and reliable design to purify water for drinking using UV radiation.

SUMMARY OF THE INVENTION

It is an aspect of the present invention that a water purifier employing a UV radiation source in a two chambered design to germicidally treat water is provided and is especially suited for point of use on demand supply of purified water in rural and less developed areas of the world.

It is a feature of the present invention that a supply reservoir chamber overlies a treatment reservoir chamber in which is mounted a horizontally extending UV radiation source that selectively exposes untreated water delivered from the supply reservoir chamber to UV radiation to germicidally treat the water to remove viruses, bacteria and mold spores to provide safe drinking water for human consumption.

It is another feature of the present invention that a control valve selectively controls the flow of untreated water from the supply reservoir chamber to the treatment reservoir chamber.

It is still another feature of the present invention that a ballast is employed, in combination with a time delay starter switch, to supply electrical energy to the UV lamp that provides the UV radiation to initially heat the lamp filaments and then supply the operating voltage to operate the lamp.

It is an advantage of the present invention that the water purifier of the present invention is low cost and easy to operate and maintain.

It is another advantage of the present invention that the water purifier of the present invention is effective to remove substantially all viruses, bacteria and mold spores from water.

It is still another advantage of the present invention that the water purifier can be operated in areas without reliable or any electricity supplied from electric power plants.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Figure 1:
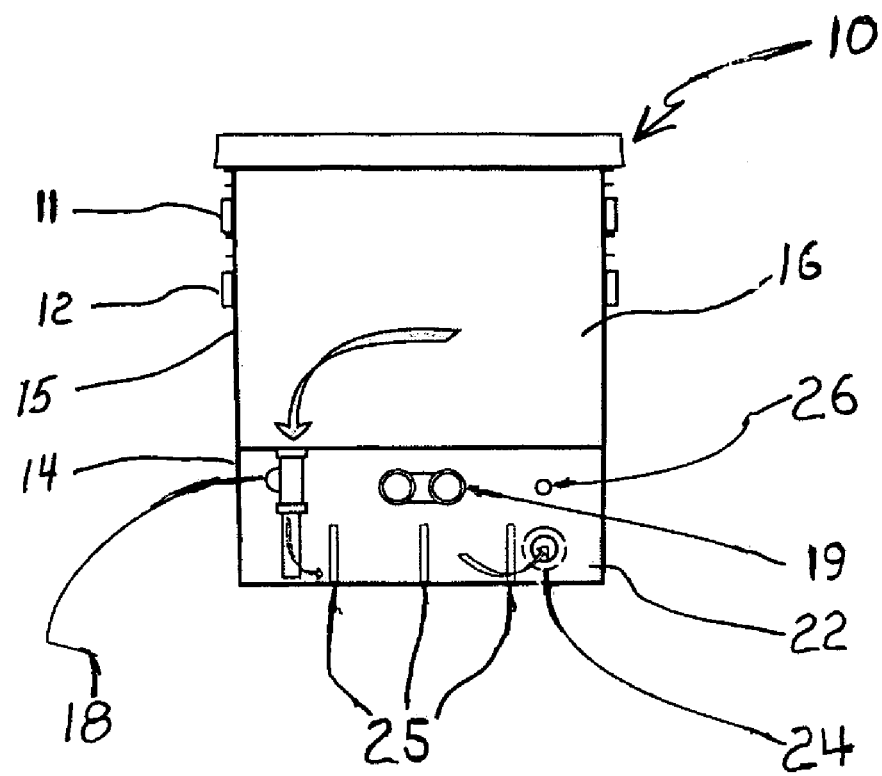
FIG. 1 is a diagrammatic illustration of the water purifier showing untreated water and water in the treatment reservoir chamber.

The UV water purifier, indicated generally by the numeral 10, as seen in FIG. 1, consists of two 20 liter cylindrical buckets 11 and 12 inserted into one another to create two separate chambers 14 and 15. Buckets 11 and 12 are formed from polyvinyl chloride (PVC) or other low cost and UV radiation resistant appropriate material. The upper supply reservoir chamber 15 is filled with the water, normally obtained from a well, by the user. The untreated water 16 selectively flows to the bottom treatment reservoir chamber 14 through a manually operated valve 18 on the bottom of the upper supply reservoir chamber 15. The untreated water 16 is disinfected in the bottom treatment reservoir chamber 14 by the UV radiation emitted from the germicidal lamp 19 that is mounted above the water in bottom treatment reservoir chamber 14. Lamp 19 is mounted generally horizontally in the chamber 14 so that it radiates UV energy onto and across the underlying generally horizontal exposed planar surface of untreated water 16 that collects below it in bottom treatment reservoir chamber 14, but high enough so that the volume of water fed from upper chamber 15 is never sufficient to reach the level of the mounted lamp 19.

A suitable manually operated valve 18 is a ½ inch threaded PVC stop and waste available commercially from Mueller Industries of Ontario, Calif., USA.

Figure 2:
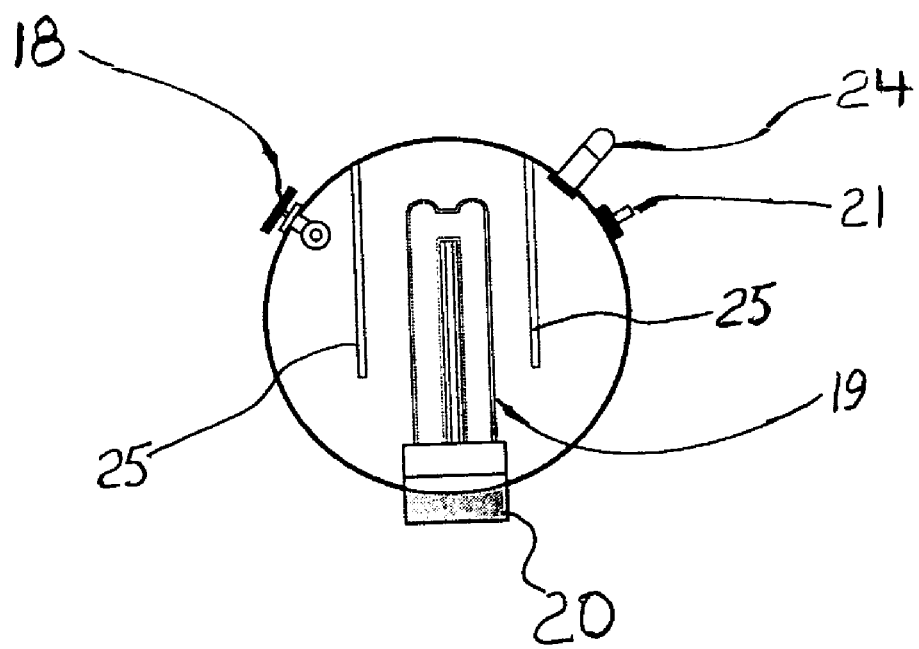
FIG. 2 is a top plan view of the UV water purifier.

Germicidal lamp 19, best seen in FIG. 2, is preferably a short-wave, low-pressure mercury vapor lamp consisting of two tubes that produce ultraviolet wavelengths that are lethal to micro-organisms. Approximately 95% of the ultraviolet radiation emitted from lamp 19 is at the mercury resonance line of 254 nanometers. This wavelength is in the region of maximum germicidal effectiveness and is highly lethal to viruses, bacteria and mold spores. As the UV radiation source, lamp 19 is available commercially from the General Electric Company in Tijuana, Mexico as part GBX18/UVC/2G11 and product code 15882. Lamp 19 is rated at 18 watts power with a single-end 4 pin base and is about 8.8 inches in length, 1.73 inches wide and 0.9 inch deep.

The ballast 20 of FIG. 2, when activated by starter switch 21, provides starting and operating voltages to the UV radiating lamp 19 and limits the amount of current during the operation of the lamp 19. Starter switch 21 is a time-delay switch which, when first powered, allows the filaments in the tubes at each end of the lamp 19 to warm up and then interrupts this part of the circuit. This provides an inductive kick from the interrupting of the current through the inductive ballast 20 that provides enough voltage to ionize the gas mixture in the tubes of lamp 19, after which the current flowing through the tubes in lamp 19 keeps the filaments hot. While the lamp 19 is turned on, ballast 20 is just an inductor, which at 60 Hz has the appropriate impedance to modulate and limit the current to the lamp to the proper value. Ballast 20, available commercially from Reactores Electrónicos Mexicanos SA de CV in Mexico D.F., Mexico, is a 12 volt DC electronic ballast that can be powered by a solar panel or a 12 volt battery. This electrical power source option makes it convenient and easy to provide power for the water purifier 10 in rural or less developed areas, especially where reliable electrical power from an electrical power plant or other source is a problem or not available at all.

Figure 3:
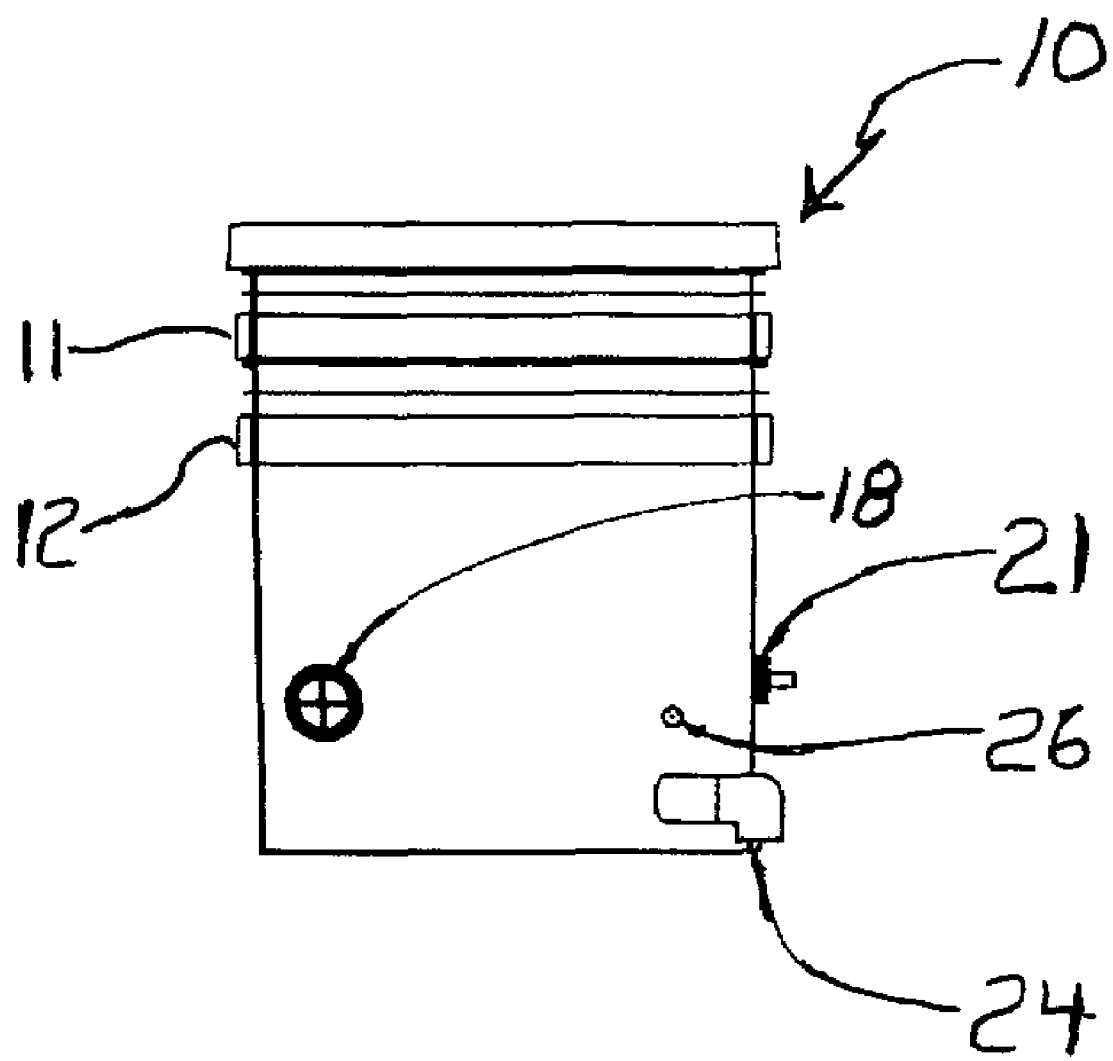
FIG. 3 is a side elevational view of the UV water purifier.

The UV radiated water 22, as seen in FIG. 1, in bottom treatment reservoir chamber 15 is dispensed through an appropriate outlet drain 24, such as a PVC elbow drain valve shown in FIG. 3. Baffles 25, best seen in FIG. 1 are employed in the bottom of reservoir chamber 15 to increase the residence time of the water being treated as the flow of radiated water moves to outlet drain 24. A viewing window 26, as seen in FIGS. 1 and 3, can be provided in the bottom treatment reservoir chamber 15 to observe the level of the germicidally treated water and to ensure that the UV lamp 19 is functioning before withdrawing water.

In operation, a user first adds untreated water 16 to the upper supply reservoir chamber 15 in bucket 12 and then turns on starter switch 21 for the germicidal lamp 19. Manually operated valve 18 is then opened to let the untreated water 16 flow to the bottom treatment reservoir chamber 15. UV radiated water is disinfected in about 20 seconds elapsed time, after which the user can collect UV radiated water 22 via the outlet drain valve 24, close the valve 18 and turn off switch 21 to shut off lamp 19.

The UV water purifier 10 has been tested and found to supply 4 liters per minute of germicidally treated water after a 20 second radiation period, effectively removing 99.99% of bacteria and viruses from the untreated water.

While the invention has been described above with references to specific embodiments thereof, it is apparent that many changes, modifications and variations in the materials, arrangements of parts and steps can be made without departing from the inventive concept disclosed herein. For example, any suitable low cost plastic material can be used to make the top and bottom bucket buckets 11 and 12 provided the material does not leach undesirable toxins upon exposure to UV radiation. Additionally, the containers employed for buckets 11 and 12 can be of any suitable geometric shape provided they provide a sufficiently planar and large exposed top surface of the water to be treated so that the UV radiation is effective to germicidally treat the water before it is dispensed from the water purifier. Where there is a reliable source of alternating current electrical power from a power grid, it is possible to use a transformer to supply direct current power to the water purifier, such as a 12 to 19 volt DC output from a 110 to 120 volt AC input power grid.

Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A point of use water purifier to supply germicidally treated water for use in rural areas having in combination:
   a) a first container having a supply reservoir chamber for receiving and holding a supply of water to be treated;
   b) a second container having a treatment reservoir chamber underlying the first container and in fluid flow communication with the supply reservoir chamber;
   c) a flow control valve connected to the supply reservoir chamber in the first container effective on demand to selectively control the flow of water to be treated from the supply reservoir chamber to the treatment reservoir chamber, the water in the treatment reservoir chamber presenting a planar exposed horizontal surface;
   d) a UV radiation source mounted horizontally in the second container and being substantially parallel to the planar exposed surface of the water in the treatment reservoir chamber effective to selectively expose the water to UV radiation for desired finite periods of time and thereby germicidally treat the water;
   e) a starter switch connected to an electrical power source effective to selectively provide energy to the UV radiation source to initially heat the radiation source and then to provide an operating voltage to provide UV radiation that is directed onto the exposed planar horizontal surface of water;
   f) a current control device connected to the starter switch and the UV radiation source effective to supply current to the UV radiation source at a proper level; and
   g) a dispenser connected to the treatment reservoir chamber in the second container effective to selectively dispense treated water.

2. The point of use water purifier according to claim 1 further comprising at least one baffle mounted in the treatment reservoir chamber of the second container effective to increase residence time of water in the treatment reservoir chamber and extend exposure of water to UV radiation before dispensing from the water purifier.

3. The point of use water purifier according to claim 1 further comprising the first container and second container being cylindrical in shape, the first container seating in the second container.

4. The point of use water purifier according to claim 1 further comprising the radiation source being an elongated mercury vapor lamp.

5. The point of use water purifier according to claim 4 further comprising the current control device being a ballast.

6. The point of use water purifier according to claim 5 further comprising the starter switch being a time delay switch effective to provide a surge of power initially to the mercury vapor lamp to ionize gases within the lamp.

7. The point of use water purifier according to claim 6 further comprising the second container having a viewing window into the treatment reservoir chamber.

* * * * *